(12) United States Patent
Atsushi et al.

(10) Patent No.: US 11,648,920 B2
(45) Date of Patent: May 16, 2023

(54) CONTROLLER, VEHICLE BODY BEHAVIOR CONTROL SYSTEM, MOTORCYCLE, AND CONTROL METHOD

(71) Applicant: Robert Bosch GmbH, Stuttgart (DE)

(72) Inventors: Hiroaki Atsushi, Kanagawa (JP); Jun Ohtaka, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 327 days.

(21) Appl. No.: 16/635,164

(22) PCT Filed: Jul. 11, 2018

(86) PCT No.: PCT/IB2018/055100
§ 371 (c)(1),
(2) Date: Jan. 30, 2020

(87) PCT Pub. No.: WO2019/038609
PCT Pub. Date: Feb. 28, 2019

(65) Prior Publication Data
US 2021/0261107 A1    Aug. 26, 2021

(30) Foreign Application Priority Data

Aug. 2, 2017    (JP) .............................. JP2017-149794

(51) Int. Cl.
*B60T 8/00*     (2006.01)
*B60T 8/32*     (2006.01)
(Continued)

(52) U.S. Cl.
CPC .............. *B60T 8/3225* (2013.01); *B60T 7/12* (2013.01); *B60T 8/1706* (2013.01); *B60T 8/18* (2013.01);
(Continued)

(58) Field of Classification Search
CPC ........ B60T 8/3225; B60T 7/12; B60T 8/1706; B60T 8/18; B60T 8/241; B60T 2230/00;
(Continued)

(56) References Cited

U.S. PATENT DOCUMENTS 10,086,808 B2 *  10/2018  Kajiyama ................. B60T 8/00
2017/0021895 A1 *  1/2017  Yasukawa .............. B62K 11/00
(Continued)

FOREIGN PATENT DOCUMENTS

DE    102013200044    7/2014
DE    102013013232    2/2015
(Continued)

OTHER PUBLICATIONS

International Search Report for Application No. PCT/IB2018/055100 dated Oct. 15, 2018 (English Translation, 3 pages).

*Primary Examiner* — Truc M Do
(74) *Attorney, Agent, or Firm* — Michael Best & Friedrich LLP

(57) ABSTRACT

The present invention obtains a controller capable of improving safety of a motorcycle.
The controller that controls vehicle body behavior of the motorcycle includes: an acquisition section that acquires trigger information generated in accordance with peripheral environment of the motorcycle; and an execution section that initiates a control mode making the motorcycle execute an automatic brake operation in accordance with the trigger information acquired by the acquisition section and makes the motorcycle generate a braking force. The acquisition section further acquires seat load information that is information of a load received by a seat of the motorcycle, and the execution section changes the automatic brake operation, which is executed in the control mode, in accordance with the seat load information acquired by the acquisition section.

9 Claims, 6 Drawing Sheets

(51) Int. Cl.
  *B62J 45/41*   (2020.01)
  *B62J 45/415*  (2020.01)
  *B60T 7/12*    (2006.01)
  *B60T 8/17*    (2006.01)
  *B60T 8/18*    (2006.01)
  *B60T 8/24*    (2006.01)
  *B62J 27/00*   (2020.01)
  *B62L 3/00*    (2006.01)

(52) U.S. Cl.
  CPC ............ *B60T 8/241* (2013.01); *B62J 27/00* (2013.01); *B62J 45/41* (2020.02); *B62J 45/4151* (2020.02); *B62L 3/00* (2013.01); *B60T 2230/00* (2013.01)

(58) Field of Classification Search
  CPC ........ B62J 45/41; B62J 45/4151; B62J 27/00; B62L 3/00
  See application file for complete search history.

(56) References Cited

U.S. PATENT DOCUMENTS

| | | | |
|---|---|---|---|
| 2017/0028971 A1* | 2/2017 | Kajiyama | B60T 8/3225 |
| 2018/0208189 A1* | 7/2018 | Ginther | B60W 30/095 |

FOREIGN PATENT DOCUMENTS

| | | |
|---|---|---|
| DE | 102013013232 A1 | 2/2015 |
| JP | 2009116882 | 5/2009 |
| WO | 2014044554 | 4/2014 |
| WO | 2016124375 | 8/2016 |

\* cited by examiner

CONTROLLER, VEHICLE BODY BEHAVIOR CONTROL SYSTEM, MOTORCYCLE, AND CONTROL METHOD

BACKGROUND OF THE INVENTION

The present invention relates to a controller and a control method for controlling vehicle body behavior of a motorcycle, a vehicle body behavior control system including the controller, and a motorcycle including the vehicle body behavior control system.

As a technique related to a motorcycle (a two-wheeled motor vehicle or a three-wheeled motor vehicle), a technique of improving occupant safety has been available. For example, a driver-assistance system is disclosed in JP-A-2009-116882. The driver-assistance system warns a occupant of the motorcycle on the basis of a detection result of a peripheral environment detector that detects peripheral environment (for example, an obstacle, a preceding vehicle, or the like) of the motorcycle during travel.

SUMMARY OF THE INVENTION

By the way, in order to improve the occupant safety, it is considered to be effective that a vehicle body behavior control system capable of executing an automatic brake operation is adopted for the motorcycle and automatically controls behavior of the motorcycle in accordance with the peripheral environment. The automatic brake operation is an operation to automatically decelerate the motorcycle by generating a braking force in the motorcycle without an operation by the occupant. For example, in regard to a four-wheeled vehicle and the like, a ratio of occupant weight to vehicle body weight is low. Thus, it is not assumed that the occupant weight has a significantly impact on vehicle body behavior in the automatic brake operation. However, in regard to the motorcycle, because the ratio of the occupant weight to the vehicle body weight is high, the automatic brake operation has to be executed in consideration of the occupant weight. Otherwise, it may be difficult to secure safety, comfort, and the like of the occupant.

The present invention has been made with the above-described problem as the background and therefore obtains a controller and a control method capable of improving safety of a motorcycle. The present invention also obtains a vehicle body behavior control system that includes such a controller. The present invention further obtains a motorcycle that has such a vehicle body behavior control system.

A controller according to the present invention is a controller that controls vehicle body behavior of a motorcycle, and includes: an acquisition section that acquires trigger information generated in accordance with peripheral environment of the motorcycle; and an execution section that initiates a control mode making the motorcycle execute an automatic brake operation in accordance with the trigger information acquired by the acquisition section and makes the motorcycle generate a braking force. The acquisition section further acquires seat load information that is information of a load received by a seat of the motorcycle, and the execution section changes the automatic brake operation, which is executed in the control mode, in accordance with the seat load information acquired by the acquisition section.

A vehicle body behavior control system according to the present invention is a vehicle body behavior control system for a motorcycle and includes: a peripheral environment detector that detects peripheral environment of the motorcycle; and a controller that controls vehicle body behavior of the motorcycle. The vehicle body behavior control system further includes an external force detector that detects an external force acting on a seat of the motorcycle. The controller includes: an acquisition section that acquires trigger information generated in accordance with output of the peripheral environment detector; and an execution section that initiates a control mode making the motorcycle execute an automatic brake operation in accordance with the trigger information acquired by the acquisition section and makes the motorcycle generate a braking force. The acquisition section further acquires seat load information that is information of a load received by a seat of the motorcycle on the basis of a detection result of the external force detector, and the execution section changes the automatic brake operation, which is executed in the control mode, in accordance with the seat load information acquired by the acquisition section.

A motorcycle according to the present invention includes the above-described vehicle body behavior control system.

A control method according to the present invention is a control method that controls vehicle body behavior of a motorcycle and includes: an acquisition step of acquiring trigger information that is generated in accordance with peripheral environment of the motorcycle; and an execution step of initiating a control mode that makes the motorcycle execute an automatic brake operation in accordance with the trigger information acquired in the acquisition step and making the motorcycle generate a braking force. In the acquisition step, seat load information that is information of a load received by a seat of the motorcycle is further acquired. In the execution step, the automatic brake operation, which is executed in the control mode, is changed in accordance with the seat load information acquired in the acquisition step.

In the controller, the vehicle body behavior control system, the motorcycle, and the control method according to the present invention, the control mode that makes the motorcycle execute the automatic brake operation is initiated in accordance with the trigger information that is generated in accordance with the peripheral environment of the motorcycle. In addition, the automatic brake operation, which is executed in the control mode, is changed in accordance with the seat load information that is the information of the load received by the seat of the motorcycle. Accordingly, a situation where it is possibly difficult to secure safety, comfort, and the like of an occupant can be handled. Thus, usefulness of the automatic brake operation is improved, and safety of the motorcycle is improved.

DETAILED DESCRIPTION

Figure 1:
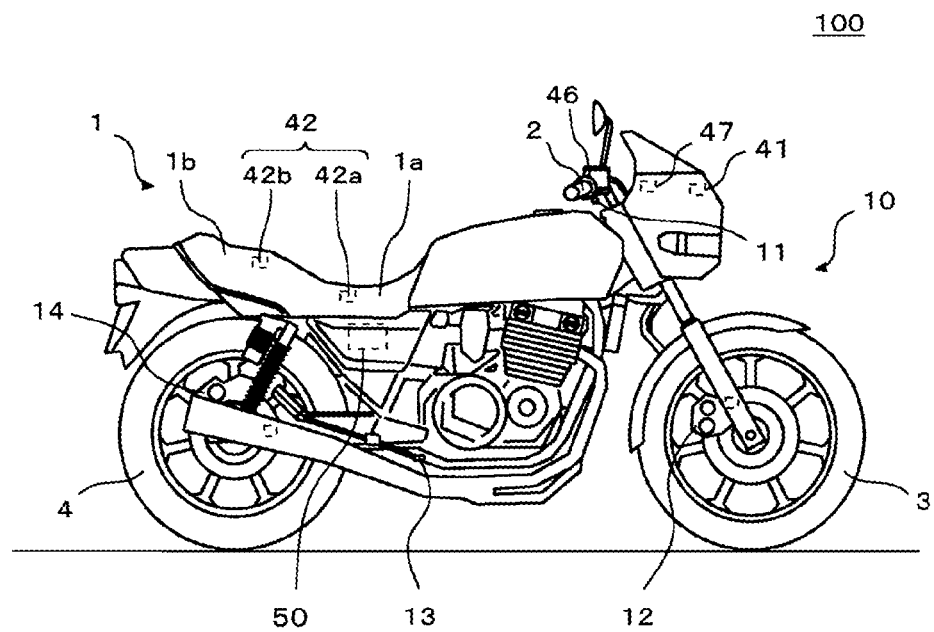
FIG. 1 is a view of a state where a vehicle body behavior control system according to Embodiment 1 of the present invention is mounted on a motorcycle.

A description will hereinafter be made on a controller, a vehicle body behavior control system, a motorcycle, and a control method according to the present invention by using the drawings.

Note that each of a configuration, an operation, and the like, which will be described below, is merely one example, and the controller, the vehicle body behavior control system, the motorcycle, and the control method according to the present invention are not limited to a case with such a configuration, such an operation, and the like.

For example, a description will hereinafter be made on a case where the motorcycle is a two-wheeled motor vehicle; however, the motorcycle may be another motorcycle (a three-wheeled motor vehicle). In addition, a description will hereinafter be made on a case where a braking force that is generated in each wheel is controlled by using a hydraulic pressure control unit; however, another mechanism may be used to control the braking force that is generated in each of the wheels. Furthermore, a description will hereinafter be made on a case where the controller executes an automatic brake operation by controlling the braking force that is generated in each of the wheels; however, the controller may execute the automatic brake operation by controlling a braking force that is generated in an engine. Moreover, a description will hereinafter be made on a case where each of a front-wheel brake mechanism and a rear-wheel brake mechanism is provided in one unit; however, at least one of the front-wheel brake mechanism and the rear-wheel brake mechanism may be provided in multiple units. Lastly, a description will hereinafter be made on a case where a peripheral environment detector that detects environment in front of the motorcycle is used and the automatic brake operation is executed in regard to a target (for example, an obstacle, a preceding vehicle, or the like) located in front of the motorcycle; however, a peripheral environment detector that detects environment in another direction (for example, a lateral direction or the like) of the motorcycle may be used, and the automatic brake operation may be executed in regard to the target located in this direction of the motorcycle.

The same or similar description will appropriately be simplified or will not be made below. In the drawings, the same or similar members or portions will be denoted by the same reference sign. In addition, a detailed structure will appropriately be depicted in a simplified manner or will not be depicted.

Embodiment 1

A description will hereinafter be made on a vehicle body behavior control system according to Embodiment 1.
<Configuration of Vehicle Body Behavior Control System>
A description will hereinafter be made on a configuration of the vehicle body behavior control system according to Embodiment 1.

Figure 2:
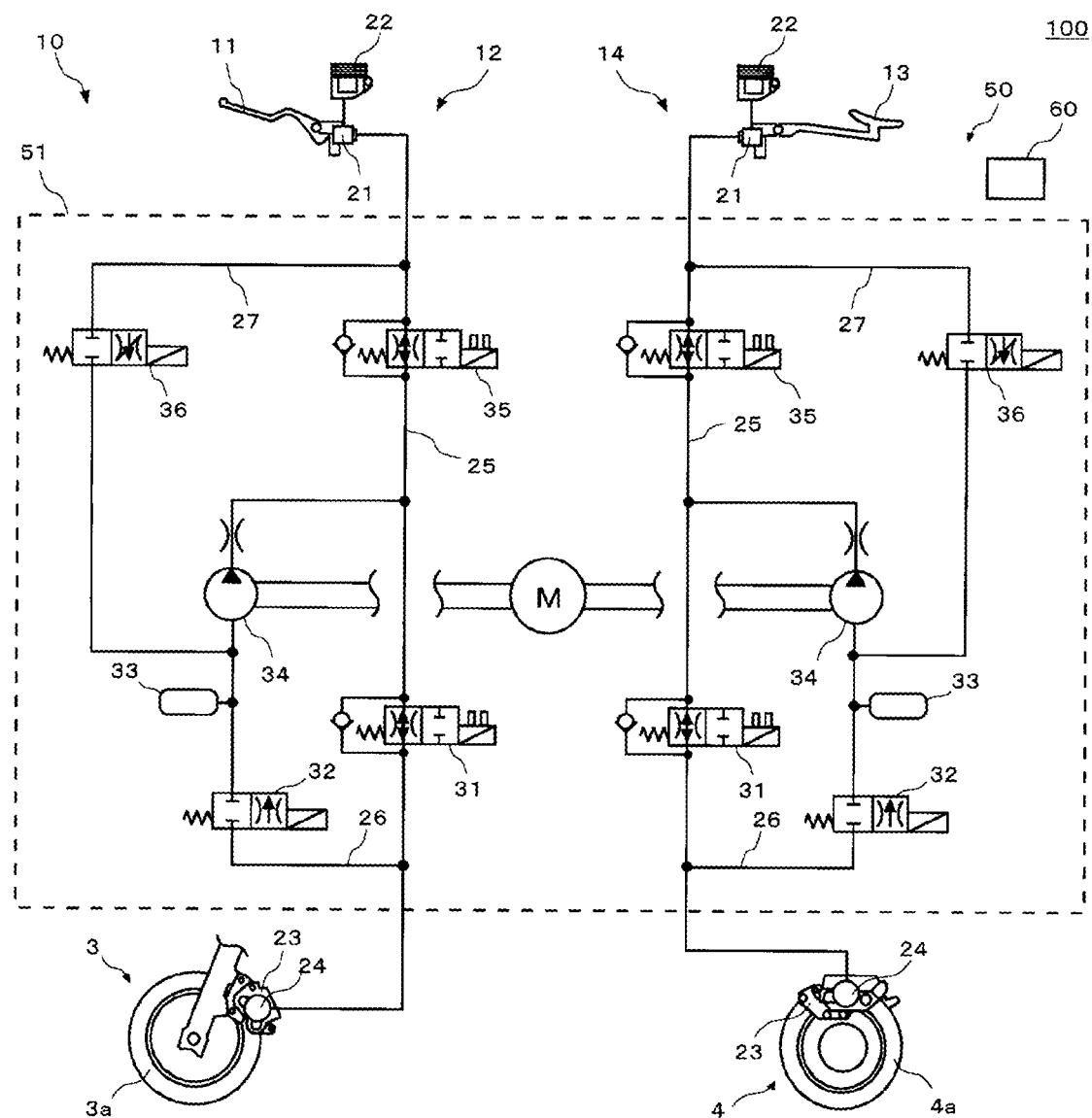
FIG. 2 is a view of a schematic configuration of the vehicle body behavior control system according to Embodiment 1 of the present invention.
Figure 3:
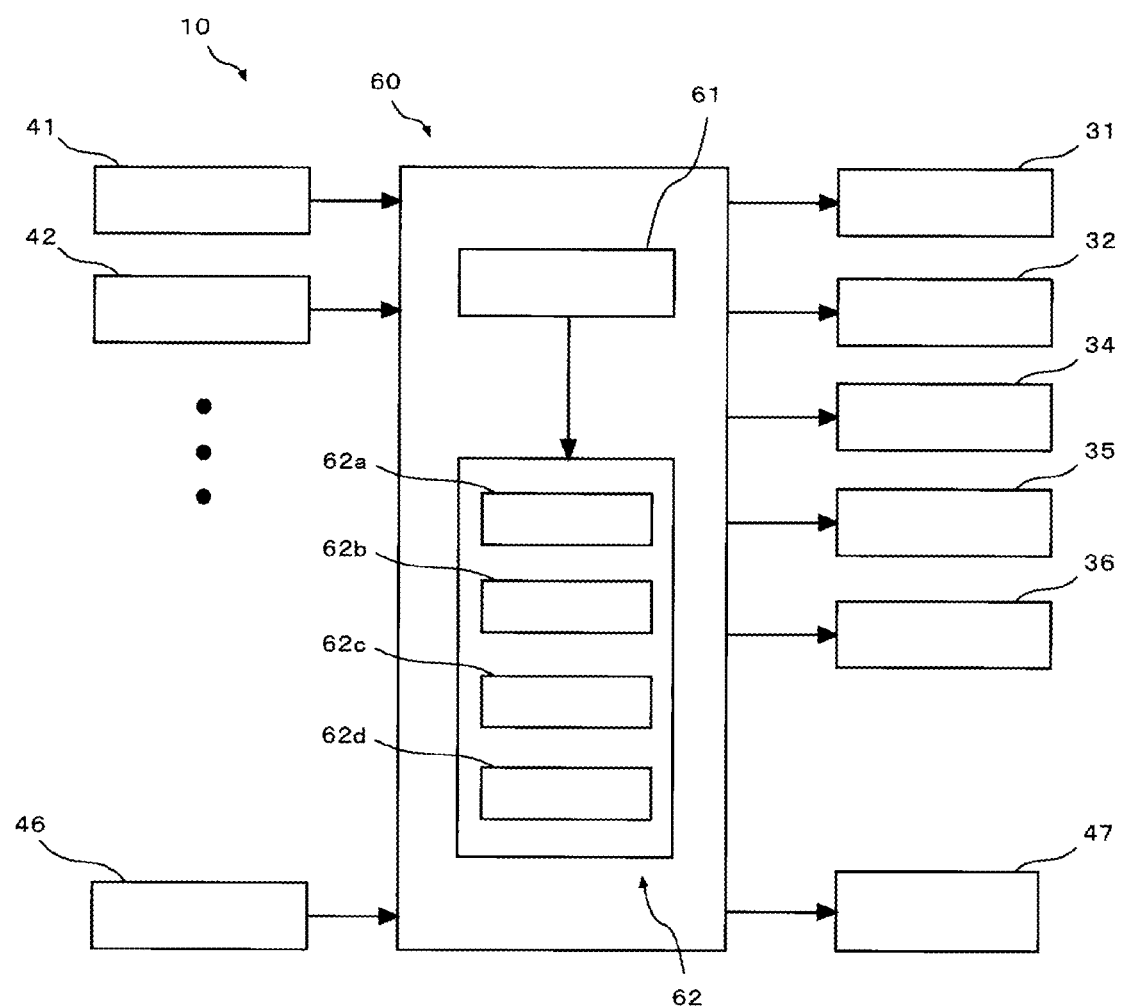
FIG. 3 is a system configuration diagram of the vehicle body behavior control system according to Embodiment 1 of the present invention.

FIG. 1 is a view of a state where the vehicle body behavior control system according to Embodiment 1 of the present invention is mounted on the motorcycle. FIG. 2 is a view of the schematic configuration of the vehicle body behavior control system according to Embodiment 1 of the present invention. FIG. 3 is a system configuration diagram of the vehicle body behavior control system according to Embodiment 1 of the present invention.

As depicted in FIG. 1 and FIG. 2, a vehicle body behavior control system 10 is mounted on a motorcycle 100. The motorcycle 100 includes: a trunk 1; a handlebar 2 that is held by the trunk 1 in a freely turnable manner; a front wheel 3 that is held by the trunk 1 in the freely turnable manner with the handlebar 2; and a rear wheel 4 that is held by the trunk 1 in a freely rotatable manner.

For example, the vehicle body behavior control system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in the interlocking manner with at least the second brake operation section 13.

The first brake operation section 11 is provided on the handlebar 2 and is operated by a driver's hand. The first brake operation section 11 is a brake lever, for example. The second brake operation section 13 is provided in a lower portion of the trunk 1 and is operated by the driver's foot. The second brake operation section 13 is a brake pedal, for example.

Each of the front-wheel brake mechanism 12 and the rear-wheel brake mechanism 14 includes: a master cylinder 21 in which a piston (not depicted) is installed; a reservoir 22 that is attached to the master cylinder 21; a brake caliper 23 that is held by the trunk 1 and has a brake pad (not depicted); a wheel cylinder 24 that is provided in the brake caliper 23; a primary channel 25 through which brake fluid in the master cylinder 21 is delivered to the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided in the primary channel 25. The secondary channel 26 bypasses a portion of the primary channel 25 between the wheel cylinder 24 side and the master cylinder 21 side of the inlet valve 31. The secondary channel 26 is sequentially provided with an outlet valve (AV) 32, an accumulator 33, and a pump 34 from an upstream side. Between an end of the primary channel 25 on the master cylinder 21 side and a portion thereof to which a downstream end of the secondary channel 26 is connected, a first valve (USV) 35 is provided. The supply channel 27 communicates between the master cylinder 21 and a suction side of the pump 34 in the secondary channel 26. A second valve (HSV) 36 is provided in the supply channel 27.

The inlet valve 31 is an electromagnetic valve that is opened in an unenergized state and closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in an unenergized state and is opened in an energized state, for example.

A hydraulic pressure control unit 50 is configured by including: members such as the inlet valves 31, the outlet valves 32, the accumulators 33, the pumps 34, the first valves 35, and the second valves 36; a base body 51 that is provided with those members and is formed with channels constituting the primary channels 25, the secondary channels 26, and the supply channels 27 therein; and a controller (ECU) 60. In the vehicle body behavior control system 10, the hydraulic pressure control unit 50 is a unit that has a function of controlling a hydraulic pressure of the brake fluid in each of the wheel cylinders 24, that is, a braking force exerted on the front wheel 3 by the front-wheel brake mechanism 12 and a braking force exerted on the rear wheel 4 by the rear-wheel brake mechanism 14.

The members may collectively be provided in the single base body 51 or may separately be provided in the multiple base bodies 51. In addition, the controller 60 may be provided as one unit or may be divided into multiple units. Furthermore, the controller 60 may be attached to the base body 51 or may be attached to a member other than the base body 51. Moreover, the controller 60 may partially or entirely be constructed of a microcomputer, a microprocessor unit, or the like, may be constructed of a member in which firmware or the like can be updated, or may be a program module or the like that is executed by a command from a CPU or the like, for example.

In a normal state, that is, in a state where the automatic brake operation, which will be described below, is not executed, the controller 60 opens the inlet valves 31, closes the outlet valves 32, opens the first valves 35, and closes the second valves 36. When the first brake operation section 11 is operated in such a state, in the front-wheel brake mechanism 12, the piston (not depicted) in the master cylinder 21 is pressed to increase the hydraulic pressure of the brake fluid in the wheel cylinder 24, the brake pad (not depicted) of the brake caliper 23 is then pressed against a rotor 3a of the front wheel 3, and the braking force is thereby exerted on the front wheel 3. Meanwhile, when the second brake operation section 13 is operated, in the rear-wheel brake mechanism 14, the piston (not depicted) in the master cylinder 21 is pressed to increase the hydraulic pressure of the brake fluid in the wheel cylinder 24, the brake pad (not depicted) of the brake caliper 23 is then pressed against a rotor 4a of the rear wheel 4, and the braking force is thereby exerted on the rear wheel 4.

As depicted in FIG. 1 and FIG. 3, the vehicle body behavior control system 10 includes: various detectors including a peripheral environment detector 41 and an external force detector 42; an input device 46, and a warning device 47. Each of the various detectors, the input device 46, and the warning device 47 is communicable with the controller 60.

The peripheral environment detector 41 detects peripheral environment of the motorcycle 100. For example, the peripheral environment detector 41 detects a distance from the motorcycle 100 to a forward obstacle (for example, a structural object, a pedestrian crossing a road, a vehicle traveling on a crossing road, or the like) as the peripheral environment. The peripheral environment detector 41 may detect another physical quantity that can substantially be converted to the distance from the motorcycle 100 to the forward obstacle. More specifically, a camera that captures an image in front of the motorcycle 100 or a distance measurement sensor that can detect the distance from the motorcycle 100 to the forward obstacle is used as the peripheral environment detector 41. The peripheral environment detector 41 is provided in a front portion of the trunk 1.

In addition, the peripheral environment detector 41 generates trigger information in accordance with the peripheral environment and outputs the trigger information. The trigger information is used to determine initiation of a control mode, which will be described below. Furthermore, the peripheral environment detector 41 computes a target braking force in conjunction with generation of the trigger information and outputs a computation result. The target braking force is a target value of an automatic braking force that is the braking force exerted on the wheels of the motorcycle 100 by the automatic brake operation executed in the control mode.

For example, the peripheral environment detector 41 computes a body speed of the motorcycle 100 on the basis of rotational frequencies of the front wheel 3 and the rear wheel 4, and estimates duration before arrival on the basis of the distance from the motorcycle 100 to the forward obstacle and the body speed. The duration before arrival is duration before the motorcycle 100 arrives at the forward obstacle. In the case where the duration before arrival is shorter than reference duration, the peripheral environment detector 41 generates the trigger information that is used to determine the initiation of the control mode in which an automatic emergency braking operation is executed as the automatic brake operation. The automatic emergency braking operation is the automatic brake operation that is executed to make the motorcycle 100 stop before arriving at the forward obstacle. The reference duration is set in accordance with estimated duration before the motorcycle 100 stops in the case where the motorcycle 100 executes the automatic emergency braking operation.

In this case, more specifically, the peripheral environment detector 41 computes the braking force with which the motorcycle 100 can stop before arriving at the forward obstacle by the automatic emergency braking operation as the target braking force. Such a target braking force is computed on the basis of the distance from the motorcycle 100 to the forward obstacle and the body speed, for example.

In addition, for example, in the case where a distance from the motorcycle 100 to a preceding vehicle falls below a distance reference value when the driver selects an autonomous cruise travel mode, which will be described below, the peripheral environment detector 41 generates the trigger information that is used to determine the initiation of the control mode in which an autonomous cruise braking operation is executed as the automatic brake operation. The autonomous cruise braking operation is the automatic brake operation that is executed to make the distance from the motorcycle 100 to the preceding vehicle approximate the distance reference value. As the distance from the motorcycle 100 to the preceding vehicle, the distance reference value is set to such a value that the occupant safety can be secured.

In this case, more specifically, the peripheral environment detector 41 computes the braking force with which the distance from the motorcycle 100 to the preceding vehicle can promptly approximate the distance reference value while a collision of the motorcycle 100 with the preceding vehicle is avoided by the autonomous cruise braking operation, and sets such a braking force as the target braking force. Such a target braking force is computed on the basis of the body speed and a difference between the distance from the motorcycle 100 to the preceding vehicle and the distance reference value, for example.

The external force detector 42 detects an external force that acts on a seat of the motorcycle 100, and outputs a detection result. The external force detector 42 includes: a first sensor 42a that detects a magnitude of the external force acting on a driver's seat 1a of the motorcycle 100; and a second sensor 42b that detects a magnitude of the external force acting on a tandem seat 1b of the motorcycle 100, for example. Note that FIG. 1 depicts a case where the driver's seat 1a and the tandem seat 1b of the motorcycle 100 are integrated; however, the driver's seat 1a and the tandem seat 1b of the motorcycle 100 may be separate components.

The first sensor 42a is a strain gauge that is attached to the inside or an outer surface of the driver's seat 1a of the motorcycle 100, for example. That is, the first sensor 42a is provided at a position that is suited to acquire information on a load received by the driver's seat 1a, that is, seat load information that is information related to weight of the occupant (the driver) who is seated on the driver's seat 1a. Note that the first sensor 42a may be another contact sensor or another non-contact sensor as long as the first sensor 42a detects the magnitude of the external force acting on the driver's seat 1a of the motorcycle 100. In addition, the first sensor 42a may detect another physical quantity that can substantially be converted to the magnitude of the external force. Furthermore, the first sensor 42a may be constructed of a single detection element or may be constructed of multiple detection elements. That is, any mode can be adopted for the first sensor 42a as long as the first sensor 42a can detect total weight that acts on the driver's seat 1a.

The second sensor 42b is a strain gauge that is attached to the inside or an outer surface of the tandem seat 1b of the motorcycle 100, for example. That is, the second sensor 42b is provided at a position that is suited to acquire information on a load received by the tandem seat 1b, that is, the seat load information that is information related to weight of the occupant who is seated on the tandem seat 1b. Note that the second sensor 42b may be another contact sensor or another non-contact sensor as long as the second sensor 42b detects the magnitude of the external force acting on the tandem seat 1b of the motorcycle 100. In addition, the second sensor 42b may detect another physical quantity that can substantially be converted to the magnitude of the external force. Furthermore, the second sensor 42b may be constructed of a single detection element or may be constructed of multiple detection elements. That is, any mode can be adopted for the second sensor 42b as long as the second sensor 42b can detect total weight that acts on the tandem seat 1b.

The input device 46 receives a travel mode selection operation by the driver and outputs a signal that corresponds to the received operation. The input device 46 at least receives the selection operation to select the autonomous cruise travel mode as the travel mode. The autonomous cruise travel mode is a travel mode in which the motorcycle 100 continues traveling with behavior thereof being automatically and at least partially controlled. In the autonomous cruise travel mode, the motorcycle 100 is controlled such that the distance therefrom to the preceding vehicle approximates the distance reference value. For example, a lever, a button, or a touch screen is possibly used as the input device 46. The input device 46 is provided on the handlebar 2, for example.

The warning device 47 may warn the occupant by sound, may warn the occupant by a display, may warn the occupant by vibrations, or may warn the occupant by a combination of any of those. More specifically, the warning device 47 is a speaker, a display, a lamp, a vibrator, or the like, may be provided on the motorcycle 100, or may be provided in an accessory such as a helmet that is associated with the motorcycle 100. The warning device 47 outputs a warning that informs the occupant of the execution of the automatic brake operation.

The controller 60 controls vehicle body behavior of the motorcycle 100. The controller 60 includes an acquisition section 61 and an execution section 62, for example. The acquisition section 61 acquires the information that is output from each of the various detectors and the input device 46, and outputs the acquired information to the execution section 62. The execution section 62 includes a trigger determination section 62a, a seat load determination section 62b, a control command setting section 62c, and a control section 62d, for example.

In accordance with a determination result by the trigger determination section 62a, the execution section 62 initiates the control mode that makes the motorcycle 100 execute the automatic brake operation. In addition, in the case where the seat load determination section 62b determines that the seat load information generated in accordance with the detection result of the external force detector 42 is information that is acquired in a state where the occupant weight is heavy, the execution section 62 makes the control command setting section 62c change a control command to be output in the control mode. The determination is made by comparing a value as the seat load information and a threshold value. The control command setting section 62c sets the braking force that is generated in the motorcycle 100 by the automatic brake operation, initiation timing of the automatic brake operation, and the like, for example. The control section 62d outputs the control command that governs the operations of the inlet valves 31, the outlet valves 32, the pumps 34, the first valves 35, the second valves 36, and the like in accordance with the above settings, so as to generate the braking force in each of the wheels of the motorcycle 100 and execute the automatic brake operation. In addition, the control section 62d outputs the control command that governs the operation of the warning device 47 in accordance with the above settings.

In a state where the automatic brake operation is executed, the controller 60 opens the inlet valves 31, closes the outlet valves 32, closes the first valves 35, and opens the second valves 36. In the case where each of the pumps 34 is driven in such a state, the hydraulic pressure of the brake fluid in each of the wheel cylinders 24 is increased, and the braking force is exerted on each of the wheels (the front wheel 3 and the rear wheel 4).

The controller 60 may include a memory element, and the information such as the threshold value used in each processing executed by the controller 60 may be stored in the memory element in advance.

<Operation of Vehicle Body Behavior Control System>

A description will be made on an operation of the vehicle body behavior control system according to Embodiment 1.

Figure 4:
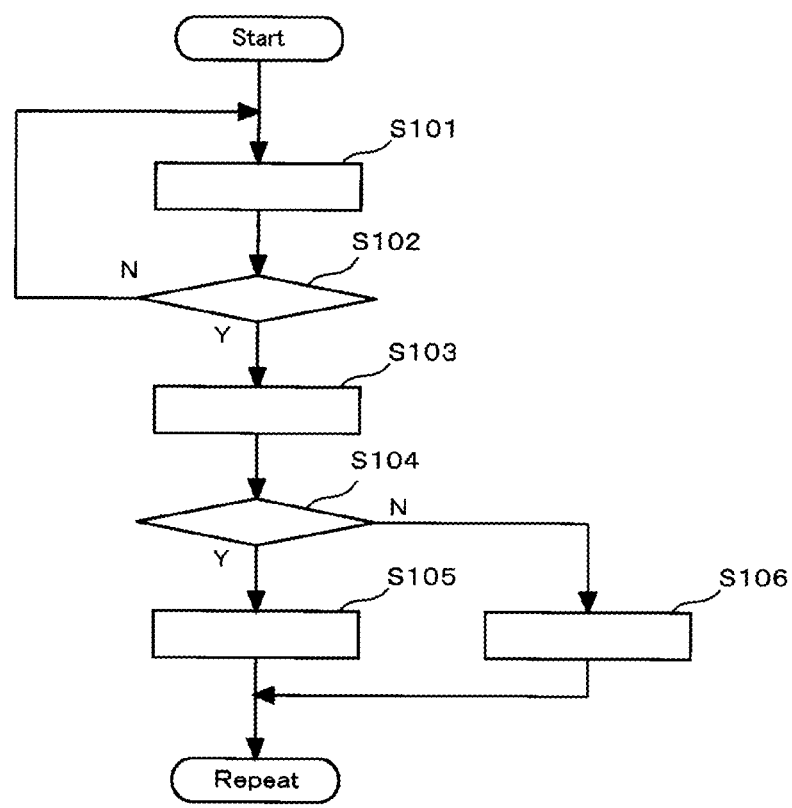
FIG. 4 is a flowchart of an operation of the vehicle body behavior control system according to Embodiment 1 of the present invention.

FIG. 4 is a flowchart of the operation of the vehicle body behavior control system according to Embodiment 1 of the present invention.

The controller 60 executes an operation flow depicted in FIG. 4 during travel of the motorcycle 100.

(Acquisition Step)

In step S101, the acquisition section 61 acquires the trigger information that is generated in accordance with the detection result of the peripheral environment detector 41.

(Execution Step)

In step S102, the trigger determination section 62a of the execution section 62 determines whether to initiate the control mode to make the motorcycle 100 execute the automatic brake operation on the basis of the trigger information acquired in step S101. If Yes, the processing proceeds to step S103. If No, the processing returns to step S101.

(Acquisition Step)

In step S103, the acquisition section 61 acquires the seat load information that corresponds to the detection result of the external force detector 42.

(Execution Step)

In step S104, the seat load determination section 62b of the execution section 62 determines whether the seat load information acquired in step S103 is the information that is acquired in a state where the occupant weight is light. If Yes, the processing proceeds to step S105. If No, the processing proceeds to step S106.

For example, in the case where the magnitude of the external force that acts on the driver's seat 1a of the motorcycle 100 is acquired as the seat load information in step S103, the seat load determination section 62b determines a case where the external force is equal to or smaller than the threshold value as the state where the occupant weight is light, and determines a case where the external force is larger than the threshold value as the state where the occupant weight is heavy.

For example, in the case where the magnitude of the external force that acts on the tandem seat 1b of the motorcycle 100 is acquired as the seat load information in step S103, the seat load determination section 62b determines the case where the external force is equal to or smaller than the threshold value as the state where the occupant weight is light, and determines the case where the external force is larger than the threshold value as the state where the occupant weight is heavy.

For example, in the case where both of the magnitude of the external force that acts on the driver's seat 1a of the motorcycle 100 and the magnitude of the external force that acts on the tandem seat 1b of the motorcycle 100 are acquired as the seat load information in step S103, the seat load determination section 62b determines a case where a sum of the external forces is equal to or smaller than the threshold value as the state where the occupants' weight is light, and determines a case where the sum of the external forces is larger than the threshold value as the state where the occupants' weight is heavy.

(Execution Step)

In step S105, the control command setting section 62c of the execution section 62 sets the braking force that is generated in the motorcycle 100 by the automatic brake operation to the normal target braking force. In addition, the control command setting section 62c of the execution section 62 sets the initiation timing of the automatic brake operation to normal timing. The control section 62d of the execution section 62 outputs the control command that corresponds to such settings and operates the hydraulic pressure control unit 50.

(Execution Step)

In step S106, the control command setting section 62c of the execution section 62 sets the braking force that is generated in the motorcycle 100 by the automatic brake operation to a larger value than the normal target braking force. In addition, the control command setting section 62c of the execution section 62 sets the initiation timing of the automatic brake operation to earlier timing than the normal timing. The control section 62d of the execution section 62 outputs the control command that corresponds to such settings and operates the hydraulic pressure control unit 50.

Note that the description has been made so far on the case where the braking force generated in the motorcycle 100 and the initiation timing of the automatic brake operation are switched at two stages in accordance with the seat load information acquired in step S103; however, they may be switched at three or more stages. In addition, only one of switching of the braking force generated in the motorcycle 100 and switching of the initiation timing of the automatic brake operation may be conducted.

The description has been made so far on the case where the automatic brake operation is set on the basis of the sum of the external force in the case where both of the magnitude of the external force that acts on the driver's seat 1a of the motorcycle 100 and the magnitude of the external force that acts on the tandem seat 1b of the motorcycle 100 are acquired as the seat load information in step S103; however, the automatic brake operation may be set on the basis of a value of each of the external forces. That is, the seat load information on the driver's seat 1a and the seat load information on the tandem seat 1b may be acquired, and the setting of the automatic brake operation may be changed in accordance with each of the seat load information on the driver's seat 1a and the seat load information on the tandem seat 1b. In addition, the magnitude of the external force that acts on the driver's seat 1a of the motorcycle 100 and the magnitude of the external force that acts on the tandem seat 1b of the motorcycle 100 may be weighed and added.

<Effects of Vehicle Body Behavior Control System>

A description will be made on effects of the vehicle body behavior control system according to Embodiment 1.

The controller 60 includes: the acquisition section 61 that acquires the trigger information generated in accordance with the peripheral environment of the motorcycle 100; and the execution section 62 that initiates the control mode, in which the motorcycle 100 executes the automatic brake operation, in accordance with the trigger information acquired by the acquisition section 61 and makes the motorcycle 100 generate the braking force. In addition, the acquisition section 61 further acquires the seat load information that is the information of the load received by the seat (the driver's seat 1a, the tandem seat 1b) of the motorcycle 100, and the execution section 62 changes the automatic brake operation, which is executed in the control mode, in accordance with the seat load information acquired by the acquisition section 61. Accordingly, a situation where it is possibly difficult to secure safety, comfort, and the like of the occupant can be handled. Thus, usefulness of the automatic brake operation is improved, and safety of the motorcycle 100 is improved.

The execution section 62 preferably changes the braking force, which is generated in the motorcycle 100 by the automatic brake operation executed in the control mode, in accordance with the seat load information acquired by the acquisition section 61. In addition, the execution section 62 preferably changes the initiation timing of the automatic brake operation executed in the control mode in accordance with the seat load information acquired by the acquisition section 61. In any of these cases, safety, comfort, and the like of the automatic brake operation is reliably secured.

The acquisition section 61 preferably acquires the seat load information on the basis of the detection result of the external force detector 42 that detects the external force acting on the seat (the driver's seat 1a, the tandem seat 1b) of the motorcycle 100. Thus, the safety, the comfort, and the like of the automatic brake operation are reliably secured.

In particular, the external force detector 42 preferably includes the first sensor 42a that detects the magnitude of the external force acting on the driver's seat 1a of the motorcycle 100. In such a case, the automatic brake operation can be switched in accordance with the weight of the occupant who is seated on the driver's seat 1a. Thus, the safety, the comfort, and the like of the automatic brake operation are reliably secured.

In particular, the external force detector 42 preferably includes the second sensor 42b that detects the magnitude of the external force acting on the tandem seat 1b of the motorcycle 100. In such a case, the automatic brake operation can be switched in accordance with the weight of the occupant who is seated on the tandem seat 1b. Thus, the safety, the comfort, and the like of the automatic brake operation are reliably secured.

The execution section 62 preferably changes the automatic brake operation, which is executed in the control mode, in accordance with a result of the comparison between the value that is acquired as the seat load information and the threshold value. Accordingly, the processing by the controller 60 is simplified, and thus throughput can be improved. Therefore, the safety, the comfort, and the like of the automatic brake operation are further reliably secured.

Embodiment 2

A description will hereinafter be made on a vehicle body behavior control system according to Embodiment 2.

Note that the overlapping or similar description to that on the vehicle body behavior control system according to Embodiment 1 will appropriately be simplified or omitted.
<Configuration of Vehicle Body Behavior Control System>

A description will hereinafter be made on a configuration of the vehicle body behavior control system according to Embodiment 2.

Figure 5:
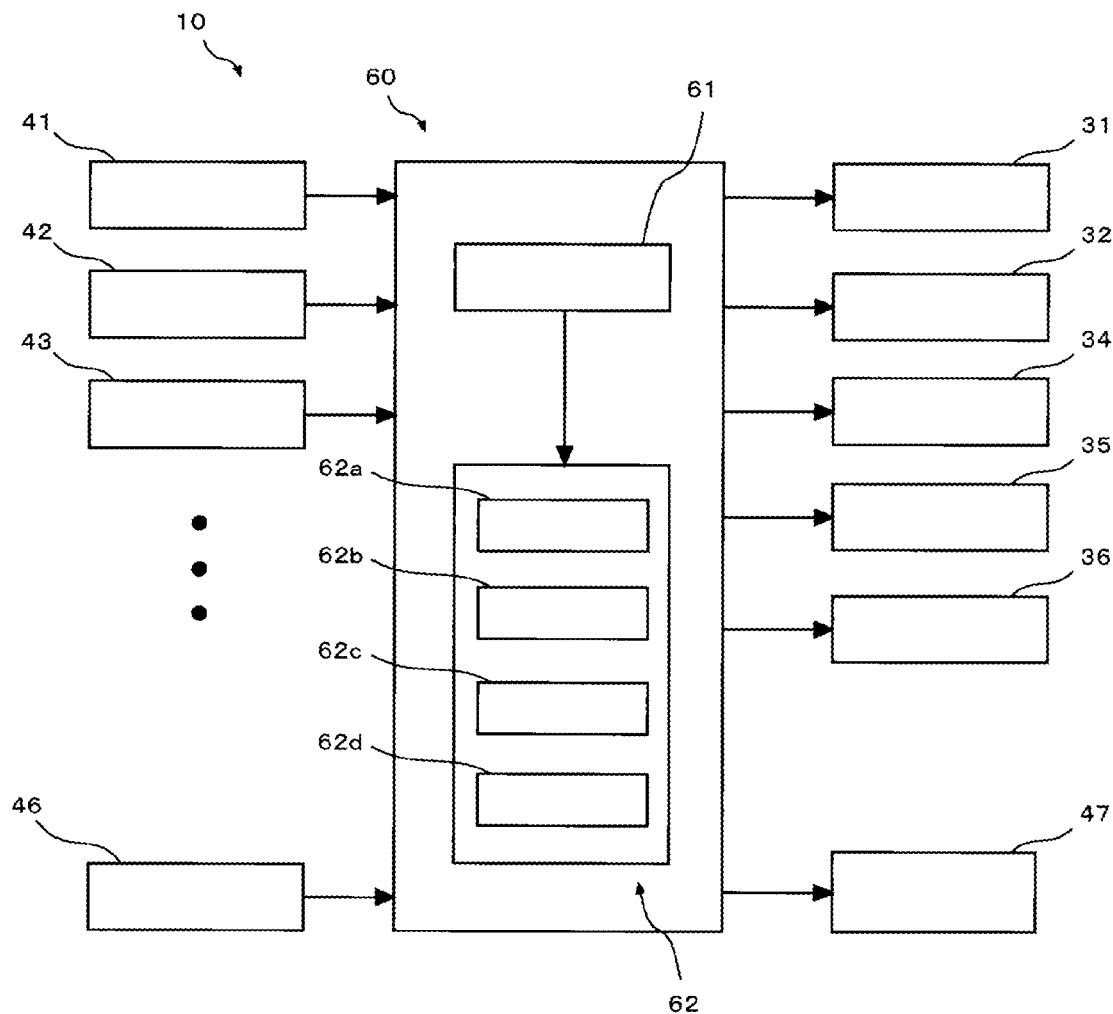
FIG. 5 is a system configuration diagram of a vehicle body behavior control system according to Embodiment 2 of the present invention.
Figure 6:
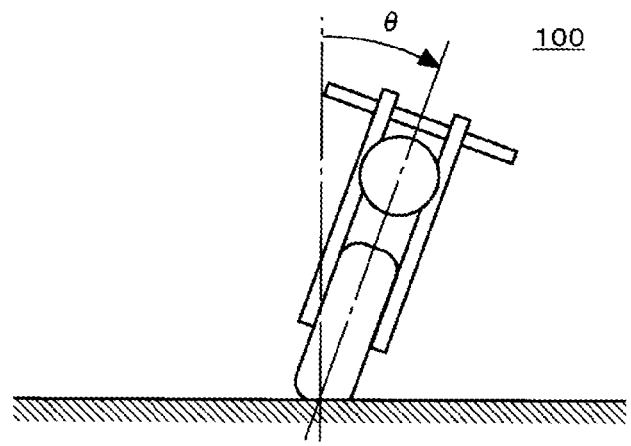
FIG. 6 is a view that defines a bank angle.

FIG. 5 is a system configuration diagram of the vehicle body behavior control system according to Embodiment 2 of the present invention. FIG. 6 is a view that defines a bank angle.

As depicted in FIG. 5, the vehicle body behavior control system 10 includes various detectors including the peripheral environment detector 41, the external force detector 42, and a vehicle body posture detector 43, the input device 46, and the warning device 47. Each of the various detectors, the input device 46, and the warning device 47 is communicable with the controller 60.

The vehicle body posture detector 43 detects information related to a bank angle of the motorcycle 100 and outputs a detection result. The bank angle corresponds to a tilt angle θ of the motorcycle 100 in a rolling direction with respect to an upper vertical direction depicted in FIG. 6. The vehicle body posture detector 43 may detect the bank angle of the motorcycle 100 itself or may detect another physical quantity that can substantially be converted to the bank angle. In addition, the vehicle body posture detector 43 may detect an angular velocity of the bank angle of the motorcycle 100 itself or may detect another physical quantity that can substantially be converted to the angular velocity of the bank angle. The vehicle body posture detector 43 is provided in the trunk 1.
<Operation of Vehicle Body Behavior Control System>

A description will be made on an operation of the vehicle body behavior control system according to Embodiment 2.

Figure 7:
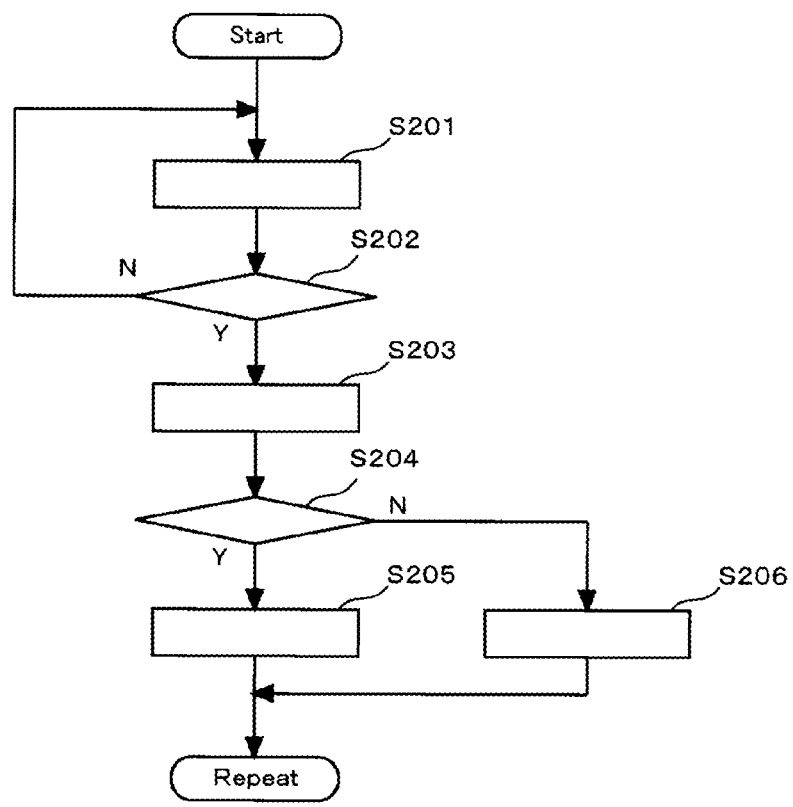
FIG. 7 is a flowchart of an operation of the vehicle body behavior control system according to Embodiment 2 of the present invention.

FIG. 7 is a flowchart of the operation of the vehicle body behavior control system according to Embodiment 2 of the present invention.

Because the step S201, step S202, step S205, and step S206 depicted in FIG. 7 are respectively similar to step S101, step S102, step S105, and step S106 depicted in FIG. 4, the description will only be made on step S203 and step S204.

(Acquisition Step)

In step S203, the acquisition section 61 acquires: the seat load information that corresponds to the detection result of the external force detector 42; and vehicle body posture information that corresponds to the detection result of the vehicle body posture detector 43.

(Execution Step)

In step S204, the seat load determination section 62b of the execution section 62 determines whether the seat load information acquired in step S203 is the information that is acquired in the state where the occupant weight is light on the basis of the comparison between the value as the seat load information and the threshold value. The threshold value is set in accordance with the vehicle body posture information acquired in step S203. If Yes, the processing proceeds to step S205. If No, the processing proceeds to step S206.

For example, in the case where the seat load determination section 62b determines whether the seat load information is the information that is acquired in the state where the occupant weight is light by comparing the magnitude of the external force acting on the seat (the driver's seat 1a, the tandem seat 1b) of the motorcycle 100 with the threshold value, the seat load determination section 62b changes the threshold value in accordance with the bank angle of the motorcycle 100 that is acquired as the vehicle body posture information. More specifically, the threshold value is reduced as the bank angle is increased.

For example, in the case where the seat load determination section 62b determines whether the seat load information is the information that is acquired in the state where the occupant weight is light by comparing the magnitude of the external force acting on the seat (the driver's seat 1a, the tandem seat 1b) of the motorcycle 100 with the threshold value, the seat load determination section 62b changes the threshold value in accordance with the angular velocity of the bank angle of the motorcycle 100 that is acquired as the vehicle body posture information. More specifically, the threshold value is reduced as the angular velocity of the bank angle is increased.
<Effects of Vehicle Body Behavior Control System>

A description will be made on effects of the vehicle body behavior control system according to Embodiment 2.

The execution section 62 preferably changes the automatic brake operation, which is executed in the control mode, in accordance with the result of the comparison between the value that is acquired as the seat load information and the threshold value. Then, the acquisition section 61 further acquires the vehicle body posture information that is related to the bank angle generated in the motorcycle 100, and the execution section 62 changes the threshold value in accordance with the vehicle body posture information acquired by the acquisition section 61. Therefore, even in a situation where the large bank angle or the high angular velocity of the bank angle is generated in the motorcycle 100 and the large bank angle or the high angular velocity of the bank angle increases an impact of the occupant weight on the vehicle body behavior, the safety of the motorcycle 100 can be improved.

The description has been made so far on Embodiment 1 and Embodiment 2. However, the invention is not limited to the description of each of the embodiments. For example, only a part of each of the embodiments may be implemented, or a part of one of the embodiments may be combined with the other embodiment. In addition, an order of steps in the operation flow depicted in each of FIG. 4 and FIG. 7 may be switched.

REFERENCE SIGNS LIST

1: trunk
1a: driver's seat
1b: tandem seat
2: handlebar
3: front wheel
3a: rotor 4: rear wheel
4a: rotor
10: vehicle body behavior control system
11: first brake operation section
12: front-wheel brake mechanism
13: second brake operation section
14: rear-wheel brake mechanism
21: master cylinder
22: reservoir
23: brake caliper
24: wheel cylinder
25: primary channel
26: secondary channel
27: supply channel
31: inlet valve
32: outlet valve
33: accumulator
34: pump
35: first valve
36: second valve
41: peripheral environment detector
42: external force detector
42a: first sensor
42b: second sensor
43: vehicle body posture detector
46: input device
47: warning device
50: hydraulic pressure control unit
51: base body
60: controller
61: acquisition section
62: execution section
62a: trigger determination section
62b: seat load determination section
62c: control command setting section
62d: control section
100: motorcycle

The invention claimed is:

1. A controller (60) that controls vehicle body behavior of a motorcycle (100), the controller (60) comprising:
an acquisition section (61) that acquires trigger information generated in accordance with peripheral environment of the motorcycle (100); and
an execution section (62) that initiates a control mode making the motorcycle (100) execute an automatic brake operation in accordance with the trigger information acquired by the acquisition section (61) and makes the motorcycle (100) generate a braking force, wherein
the acquisition section (61) further acquires seat load information that is information of a dynamic load received by a seat (1a, 1b) of the motorcycle (100) and vehicle body posture information that is related to a bank angle generated in the motorcycle (100),
the execution section (62) changes the braking force of the automatic brake operation, which is executed in the control mode, in accordance with a comparison of a threshold value and the seat load information acquired by the acquisition section (61), and
the execution section (62) changes the threshold value in accordance with the vehicle body posture information acquired by the acquisition section (61).

2. The controller according to claim 1, wherein
the execution section (62) changes the braking force, which is generated in the motorcycle (100) in the automatic brake operation executed in the control mode, in accordance with the seat load information acquired by the acquisition section (61).

3. The controller according to claim 1, wherein
the execution section (62) changes initiation timing of the automatic brake operation, which is executed in the control mode, in accordance with the seat load information acquired by the acquisition section (61).

4. The controller according to claim 1, wherein
the acquisition section (61) acquires the seat load information on the basis of a detection result of an external force detector (42) that detects an external force acting on the seat (1a, 1b) of the motorcycle (100).

5. The controller according to claim 4, wherein
the external force detector (42) includes a sensor (42a) that detects the load received by a driver's seat (1a) of the motorcycle (100).

6. The controller according to claim 4, wherein
the external force detector (42) includes a sensor (42b) that detects the load received by a tandem seat (1b) of the motorcycle (100).

7. A vehicle body behavior control system (10) for a motorcycle (100), the vehicle body behavior control system (10) comprising:
a peripheral environment detector (41) that detects peripheral environment of the motorcycle (100); and
a controller (60) that controls vehicle body behavior of the motorcycle (100),
the vehicle body behavior control system further comprising:
a vehicle body posture detector (43) that detects a bank angle of the motorcycle (100), and
an external force detector (42) that detects an external force acting on a seat (1a, 1b) of the motorcycle (100), wherein
the controller (60) includes:
an acquisition section (61) that acquires trigger information generated in accordance with output of the peripheral environment detector (41); and
an execution section (62) that initiates a control mode making the motorcycle (100) execute an automatic brake operation in accordance with the trigger information acquired by the acquisition section (61) and makes the motorcycle (100) generate a braking force,
the acquisition section (61) further acquires vehicle body posture information that is related to the bank angle generated in the motorcycle (100) and seat load information that is information of a dynamic load received by a seat (1a, 1b) of the motorcycle (100) on the basis of a detection result of the external force detector (42),
the execution section (62) changes the braking force of the automatic brake operation, which is executed in the control mode, in accordance with a comparison of a threshold value and the seat load information acquired by the acquisition section (61), and
the execution section (62) changes the threshold value in accordance with the vehicle body posture information acquired by the acquisition section (61).

8. A motorcycle comprising:
the vehicle body behavior control system (10) according to claim 7.

9. A control method that controls vehicle body behavior of a motorcycle (100), the control method comprising:
an acquisition step (S101, S103, S201, S203) of acquiring trigger information that is generated in accordance with peripheral environment of the motorcycle (100); and
an execution step (S102, S104 to S106, S202, S204 to S206) of initiating a control mode that makes the motorcycle (100) execute an automatic brake operation in accordance with the trigger information acquired in the acquisition step (S101, S103, S201, S203) and making the motorcycle (100) generate a braking force, wherein in the acquisition step (S101, S103, S201, S203), seat load information that is information of a dynamic load received by a seat (1*a*, 1*b*) of the motorcycle (100) and vehicle body posture information that is related to a bank angle generated in the motorcycle (100) are further acquired, in the execution step (S102, S104 to S106, S202, S204 to S206), the braking force of the automatic brake operation, which is executed in the control mode, is changed in accordance with a comparison of a threshold value and the seat load information acquired in the acquisition step (S101, S103, S201, S203), and in the execution section step (S203 to S204), the threshold value is changed in accordance with the vehicle body posture information acquired by the acquisition section (61).

\* \* \* \* \*